J. ELLIS.

INSULATOR.

APPLICATION FILED APR. 28, 1913.

Reissued June 16, 1914. 13,748.

Witnesses:
Harry H. Reiss
George G. Anderson

Inventor
John Ellis,
By Hugh K. Wagner,
His Attorney.

UNITED STATES PATENT OFFICE

JOHN ELLIS, OF ST. JAMES, MISSOURI.

INSULATOR.

13,748. Specification of Reissued Letters Patent. Reissued June 16, 1914.

Original No. 1,039,980, dated June 18, 1912, Serial No. 667,543. Application for reissue filed April 28, 1913. Serial No. 764,253.

*To all whom it may concern:*

Be it known that I, JOHN ELLIS, a citizen of the United States, formerly residing at Salem, in the county of Dent, State of Missouri, but now residing at St. James, in the county of Phelps, State of Missouri, have invented certain new and useful Improvements in Insulators, of which the following is hereby declared to be a full, clear, and exact description, reference being had therein to the accompanying drawings.

This invention relates to new and useful improvements in insulators, and has for its object to provide an improved insulator of such construction that the wires which are attached thereto will be held in place without the use of binding or tying wires as is now customary.

The present invention does not require the use of the binding or tying wires, and consequently eliminates the loss of time which is consumed by the use thereof, and, also, the waste and expense of wire.

Further, the present invention consists of the novel features of construction and arrangement of parts hereinafter more fully described and pointed out in the claim.

Figure 1:
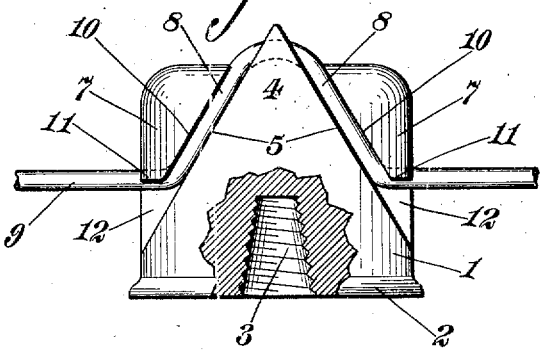
Figure 2:
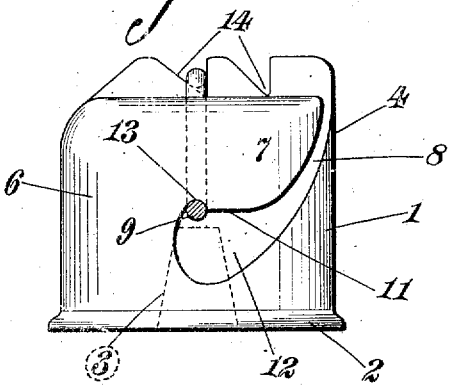
Figure 3:
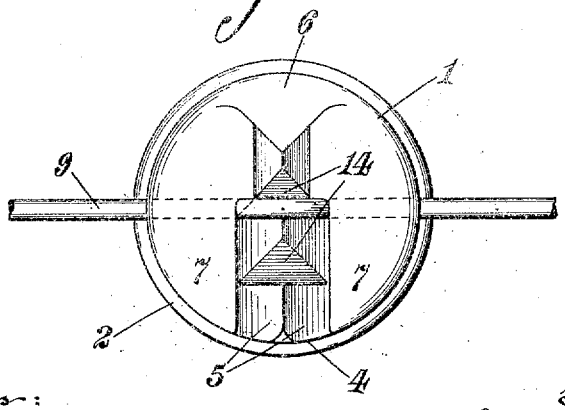

In the accompanying drawings forming part of this specification, in which like numbers of reference denote like parts wherever they occur, Figure 1 is an elevation of an insulator embodying the present invention, parts thereof being broken away; Fig. 2 is a similar view taken at a right angle to Fig. 1; and Fig. 3 is a top plan view of same.

The insulator embodying the present invention may be formed of glass, porcelain, or any other non-conductive material, and may have a cylindrical configuration, a cylindrical one being depicted in the drawings for the purpose of illustration.

Referring to the drawings, the body 1 of the insulator and the base 2, are preferably provided with a screw-threaded socket 3 for the reception of a screw-threaded pin (not shown), by means of which the insulator is supported and is secured to a cross-arm, bracket, etc., of a telegraph, telephone, or other pole, or to any other supporting member. The body 1 of the insulator has a gable-shaped or tapered part 4, the sloping faces 5 of which extend inwardly from the outer surface of the body 1 to approximately the middle of said body and converge upwardly from the base 2 or points near said base. The part 6 of the body 1 bears a pair of wings or arms 7, which wings or arms are arranged so as to extend over the sloping faces 5, respectively, of the tapered or beveled part 4 and are spaced from the sloping faces 5, thereby forming slots or passages 8 for the reception of a line wire 9, the faces 10 of said wings or arms that form walls of said slots or passages being arranged to converge upwardly so as to be substantially parallel to the sloping faces 5 of the part 4, as best seen in Fig. 1. The upper faces of the wings or arms 7 are preferably flush with the top of the part 6, and the lower sides 11 of said wings or arms are straightened so as to be substantially parallel to the plane of the base 2 and to form in combination with the lower portions of the sloping faces 5 of the tapered part 4 enlarged entrances 12 to the slots or passages 8, in order to permit the line wire 9 to be placed readily into the slots or passages 8 or to be removed readily from said slots or passages, each lower side 11 containing a notch 13 to receive the line wire.

The ridge or top of the part 4 of the body 1 projects above the plane of the top of the part 6 and extends across or nearly across the top of the latter, being provided with a notch or recess 14 or a plurality of such notches or recesses. Each notch or recess 14 coincides with the slots or passages 8, and is preferably V-shaped, one side thereof being substantially vertical and the other side thereof sloping downwardly toward the open sides of said slots or passages, as best seen in Fig. 2.

The line wire 9 rests in a notch or recess 14 in the ridge of the part 4 of the body 1, then extends downwardly through the slots or passages 8 and out through the notches 13 in the lower sides 11 of the wings or arms 7. Thus, it will readily be seen that the line wire 9 is securely and effectively held from displacement, and is at the same time attached to the insulator without the use of binding or tying wires or any outside or independent securing means.

The insulator is adapted for use in both inside and outside work, and can be used as a bell wiring hanger, automobile wiring hanger, clothes-line or other hanger, as an anchoring device for all signal lines, and for various other purposes.

I claim:

As a new article of manufacture, an insulator composed of a body having opposite side parts thereof beveled upwardly to an apex, said apex being notched and extending above the top end of the body, and comparatively wide arms formed upon the body and having inner side faces which extend over the faces of said beveled portion in spaced relation and parallel to said beveled faces throughout the areas of said inner side faces of the arms, the upper sides of the arms extending below the apex and being substantially in alinement with the bottoms of the notches, the free ends of the arms terminating in spaced relation to the outer or free edges of the beveled faces, the portions of the beveled faces which project beyond the free ends of the arms providing upwardly facing parts on which the wire may be placed from above and supported in moving the wire into the spaces between the beveled faces and the arms, the lower sides of the arms being parallel to the plane of the base and being arranged to extend opposite to points adjacent the centers of the lengths of said beveled faces, the inner side faces of the arms between the upper and lower sides thereof being engaged throughout with the wire to hold same flat against said beveled faces.

In testimony whereof, I hereunto affix my signature in presence of two witnesses.

JOHN ELLIS.

Witnesses:

W. M. Brown,

J. W. Wycoff.